United States Patent
Bunn et al.

(10) Patent No.: US 6,945,278 B2
(45) Date of Patent: Sep. 20, 2005

(54) FULLY INTEGRATED AIRCRAFT CABIN PRESSURE CONTROL SYSTEM VALVE

(75) Inventors: Andrew D. Bunn, Oro Valley, AZ (US); Darrell W. Horner, Oro Valley, AZ (US); Timothy R. Arthurs, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 156 days.

(21) Appl. No.: 10/427,765

(22) Filed: Apr. 30, 2003

(65) Prior Publication Data

US 2004/0216792 A1 Nov. 4, 2004

(51) Int. Cl.[7] .............................................. B64D 13/00
(52) U.S. Cl. ..................... 137/899.2; 137/81.1; 454/72; 244/118.5
(58) Field of Search ............................. 137/899.2, 81.1; 454/72; 244/118.5

(56) References Cited

U.S. PATENT DOCUMENTS

| | | | |
|---|---|---|---|
| 2,556,159 A | * | 6/1951 | Arthur .......................... 454/74 |
| 2,733,889 A | | 2/1956 | Mallingly |
| 2,902,916 A | | 9/1959 | Smith |
| 2,966,109 A | * | 12/1960 | Best ............................. 454/71 |
| 3,376,802 A | * | 4/1968 | Emmons ....................... 454/73 |
| 3,426,984 A | | 2/1969 | Emmons |
| 3,450,020 A | * | 6/1969 | Andresen, Jr. ................ 454/73 |
| 3,544,045 A | | 12/1970 | Butscher |
| 3,638,679 A | | 2/1972 | Gorchev |
| 3,672,630 A | | 6/1972 | Naumburg et al. |
| 3,740,006 A | | 6/1973 | Maher |
| 3,752,422 A | | 8/1973 | Runnels et al. |
| 4,033,247 A | | 7/1977 | Murphy |
| 4,428,194 A | | 1/1984 | Stokes et al. |
| 4,445,532 A | | 5/1984 | Mitchell |

(Continued)

FOREIGN PATENT DOCUMENTS

EP      1 209 079 A      5/2002

OTHER PUBLICATIONS

U.S. Appl. No. 10/014,135, filed Dec. 13, 2001, by Sewa Sandhu and Kenyon Kehl entitled "Cable Assembly And Air Outflow Valve Incorporating The Same".

PCT International Search Report PCT/US2004/013535 filed Nov. 15, 2004.

*Primary Examiner*—A. Michael Chambers
(74) *Attorney, Agent, or Firm*—Ingrassia Fisher & Lorenz

(57) ABSTRACT

An aircraft cabin pressure control system valve integrates three cabin pressure control functions, main cabin flow control, positive pressure relief, and negative pressure relief, into a single valve package. The valve includes a control valve that is used for main cabin flow control, for primary positive pressure relief, and primary negative pressure relief. The valve can also include a positive pressure relief valve and a negative pressure relief valve, which are used for backup positive pressure relief and negative pressure relief, respectively. An actuator for the valve is also provided.

19 Claims, 3 Drawing Sheets

U.S. PATENT DOCUMENTS

| | | |
|---|---|---|
| 4,458,718 A | 7/1984 | Vick |
| 4,480,812 A | 11/1984 | Carpentier |
| 4,480,815 A | 11/1984 | Kreij |
| 4,553,474 A | 11/1985 | Wong et al. |
| 4,635,899 A | 1/1987 | Eshleman |
| RE32,554 E | 12/1987 | Murphy |
| 4,768,555 A | 9/1988 | Abel |
| 4,960,249 A | 10/1990 | Signoret et al. |
| 4,964,422 A | 10/1990 | Ball et al. |
| 4,964,431 A | 10/1990 | Ball et al. |
| 4,967,778 A | 11/1990 | Ball et al. |
| 5,000,213 A | 3/1991 | Tervo et al. |
| 5,005,804 A | 4/1991 | Andersen et al. |
| 5,029,599 A | 7/1991 | Ball |
| 5,046,686 A | 9/1991 | Carla et al. |
| 5,067,506 A | 11/1991 | Ball et al. |
| 5,102,097 A | 4/1992 | Davis et al. |
| 5,113,910 A | 5/1992 | Ball |
| 5,334,090 A | 8/1994 | Rix |
| 5,351,934 A | 10/1994 | Jensen et al. |
| 5,386,848 A | 2/1995 | Gilchrist et al. |
| 5,590,852 A | 1/1997 | Olson |
| 5,899,064 A | 5/1999 | Cheung |
| 5,927,335 A | 7/1999 | Christensen |
| 6,006,780 A | 12/1999 | Tseng et al. |
| 6,116,541 A | 9/2000 | Chuang et al. |
| 6,233,919 B1 | 5/2001 | Abel et al. |
| 6,273,136 B1 | 8/2001 | Steinert et al. |

* cited by examiner

FULLY INTEGRATED AIRCRAFT CABIN PRESSURE CONTROL SYSTEM VALVE

FIELD OF THE INVENTION

The present invention relates to aircraft cabin pressure control and, more particularly, to an aircraft valve that incorporates multiple cabin pressure control system functions.

BACKGROUND OF THE INVENTION

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, the ambient pressure outside of the aircraft decreases and, unless otherwise controlled, excessive amounts of air could leak out of the aircraft cabin causing it to decompress to an undesirably low pressure. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin pressure altitude to minimize passenger discomfort.

In addition to controlling cabin pressure for passenger and crew comfort, many aircraft cabin pressure control systems also function to limit cabin differential pressure below one or more predetermined magnitudes. Cabin differential pressure refers to the pressure difference between the interior and exterior of the aircraft fuselage, and for many aircraft includes both a "positive" differential pressure limit and a "negative" differential pressure limit. A positive differential pressure occurs when the pressure within the fuselage is greater than the exterior pressure, and a negative differential pressure occurs when the pressure within the fuselage is less than the exterior pressure.

Regulations promulgated by various governmental certification authorities for many aircraft state that the aircraft needs to be equipped with systems and components that not only maintain aircraft cabin altitude within a relatively comfortable range, but that additionally limit cabin differential pressure below the aircraft's positive and negative limits. In addition, these same regulations state that at least two components be provided to limit cabin differential pressure below the positive limit, and at least two components be provided to limit cabin differential pressure below the negative limit.

To provide the functionality and redundancy stated in the above-noted regulations, aircraft cabin pressure control systems may be equipped with an outflow valve, one or more positive pressure relief valves, and one or more negative pressure relief valves, depending on system design and configuration. For example, in some aircraft, the cabin pressure control system includes an outflow valve, two positive pressure relief valves, and two negative pressure relief valves. This system configuration results in a total of five individual valve components and up to five separate penetrations in the aircraft fuselage. Other aircraft include an outflow control valve, which also provides a positive pressure relief function, a dual-function positive and negative pressure relief valve, and a negative pressure relief valve. This system configuration reduces the total number of valve components to three, but still results in three separate fuselage penetrations. Still other aircraft include an outflow valve, and two dual-function positive and negative pressure relief valves. Again, this system configuration results in three valve components and three fuselage penetrations.

Although the above-described aircraft cabin pressure control system configurations are robustly designed and are safe and reliable, each suffers certain drawbacks. For example, each valve component within the system increases the overall system and aircraft weight and can, in some cases, result in increased cost, complexity, and weight. Each valve component also takes up a certain amount of scarce interior space for both mounting and connection of and electrical and/or pneumatic interface. In addition, to the extent that each valve includes an individual fuselage penetration, there is a potential fuselage leakage source, and the accompanying maintenance associated with each valve. One or more of these factors can adversely affect aircraft initial and lifetime costs, as well as aircraft down time.

Hence, there is a need for an aircraft cabin pressure control system valve that has one or more of the following benefits: reduced overall system and aircraft weight; reduced number of fuselage penetrations; a reduced system space envelope; and, simplified system maintenance, without adversely affecting aircraft lifecycle costs. The present invention addresses one or more of these needs.

SUMMARY OF THE INVENTION

The present invention provides an aircraft cabin pressure control system valve that integrates three major cabin pressure control functions, main cabin flow control, positive pressure relief, and negative pressure relief into a single valve package. This integration of functions simplifies installation, reduces aircraft weight, reduces the number of penetrations through the aircraft fuselage, and reduces the maintenance associated with the cabin pressure control system, all of which can result in significant cost and time savings.

In one embodiment, and by way of example only, an aircraft cabin pressure control system valve includes a valve body, an outflow control valve, a first pressure relief valve, and a second pressure relief valve. The valve body is adapted to mount proximate an aircraft fuselage and has at least a first flow port, a second flow port, and a main flow passage therebetween. The outflow control valve is mounted proximate the valve body and is moveable between an open position and a closed position to thereby control airflow through the main flow passage. The first pressure relief valve is mounted proximate the valve body and is configured to fluidly couple the main flow passage to an environment external thereof when fluid pressure in the main flow passage exceeds fluid pressure in the external environment by a first predetermined magnitude. The second pressure relief valve is mounted proximate the valve body and is configured to fluidly couple the main flow passage to the external environment when the fluid pressure in the external environment exceeds the fluid pressure in the main flow passage by a second predetermined magnitude.

In another exemplary embodiment, an integrated aircraft cabin pressure control system includes a valve body, an outflow control valve, a first pressure relief valve, a second pressure relief valve, a controller circuit, and a valve actuator. The valve body is adapted to mount proximate an aircraft fuselage and has at least a first flow port, a second flow port, and a main flow passage therebetween. The outflow control valve is mounted proximate the valve body and is moveable between an open position and a closed position to thereby control airflow through the main flow passage. The first pressure relief valve is mounted proximate the valve body and is configured to fluidly couple the main flow passage to an environment external thereof when fluid pressure in the main flow passage exceeds fluid pressure in the external environment by a first predetermined magnitude. The second pressure relief valve is mounted proximate the valve body and is configured to fluidly couple the main flow passage to the external environment when the fluid pressure in the external environment exceeds the fluid pressure in the main flow passage by a second predetermined magnitude. The controller circuit is mounted on the valve body, is adapted to receive one or more aircraft cabin pressure signals, and is operable, in response thereto, to supply one or more valve actuation signals. The valve actuator is mounted proximate the valve body, is coupled to receive the valve actuation signals, and is operable, in response thereto, to position the outflow control valve.

In yet another exemplary embodiment, a valve actuator includes a motor, an actuator arm, and a valve movement tab. The motor is adapted to receive valve position command signals and is operable, in response thereto, to rotate in an open direction or a close direction. The actuator arm is coupled to the motor and is configured to move translationally in an open direction and a close direction in response to the motor rotation in the open direction and close direction, respectively. The valve movement tab is coupled to the actuator arm and is configured to rotate in an open direction and a close direction in response to the actuator arm translation in the open direction and close direction, respectively. The valve movement tab is configured to contact a valve gate to thereby at least move the valve gate from the closed position to an open position.

Other independent features and advantages of the preferred cabin pressure control system valve will become apparent from the following detailed description, taken in conjunction with the accompanying drawings which illustrate, by way of example, the principles of the invention.

DETAILED DESCRIPTION OF A PREFERRED EMBODIMENT

Figure 3:
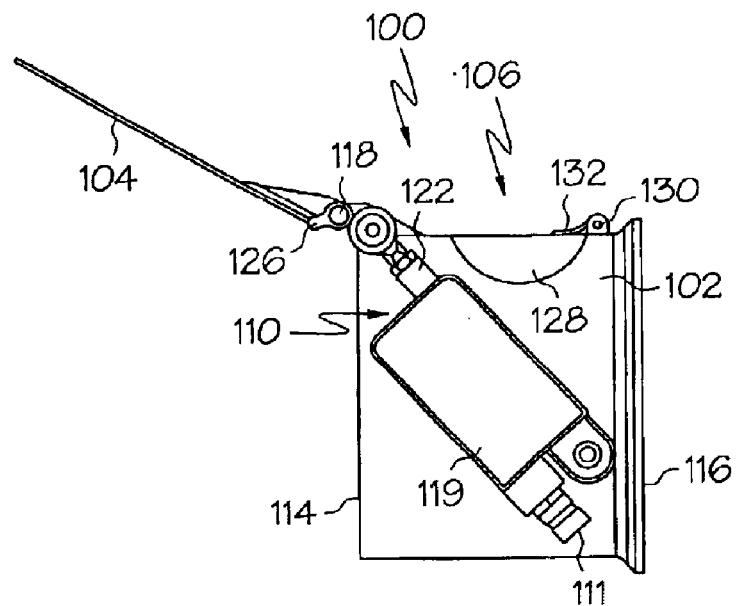
FIGS. 3 and 4 are side and perspective views, respectively, of the exemplary valve shown in FIGS. 1 and 2, with the valve in the fully open position.
Figure 4:
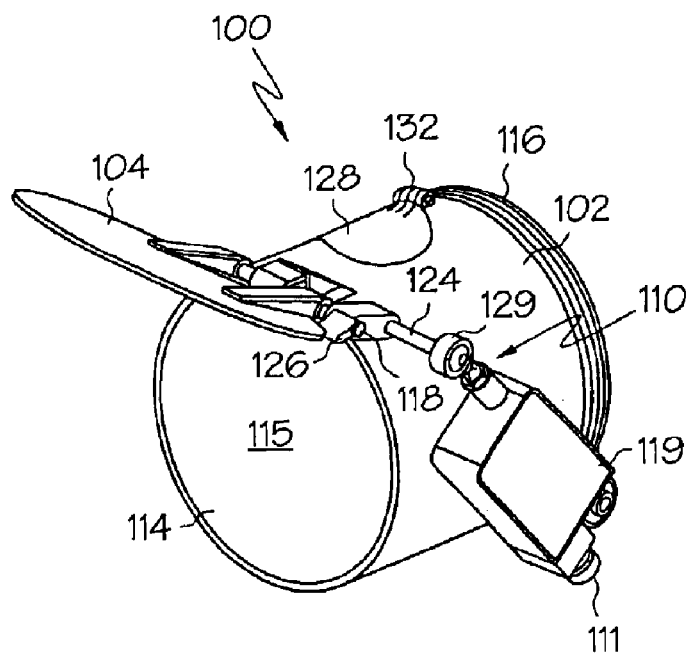
Figure 5:
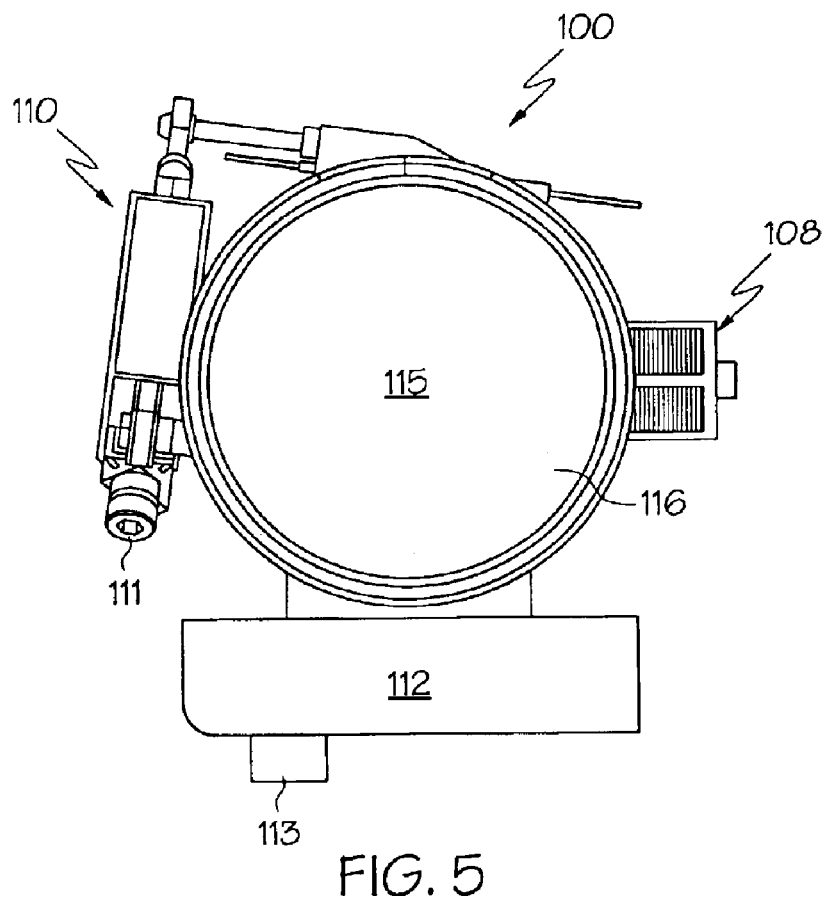
FIG. 5 is an end view and of the exemplary valve shown in FIGS. 1–4.

An exemplary embodiment of an integrated cabin pressure control system valve 100 is shown in FIGS. 1–5, and includes a valve body 102, a valve gate 104, a negative pressure relief valve 106, a positive pressure relief valve 108, an actuator assembly 110, and a controller circuit 112 (shown in FIG. 5 only). The valve body 102 is preferably configured as a generally tubular duct, having a first flow port 114, a second flow port 116, and a main flow passage 115 therebetween. In addition, the valve body 102 is preferably adapted to mount to an aircraft fuselage (not shown), such that the first flow port 114 is in fluid communication with the aircraft cabin within the fuselage and the second flow port 116 is in fluid communication with the ambient environment outside the fuselage. It will be appreciated that the valve body 102 is not limited to a generally tubular shape, but could be variously shaped.

Figure 1:
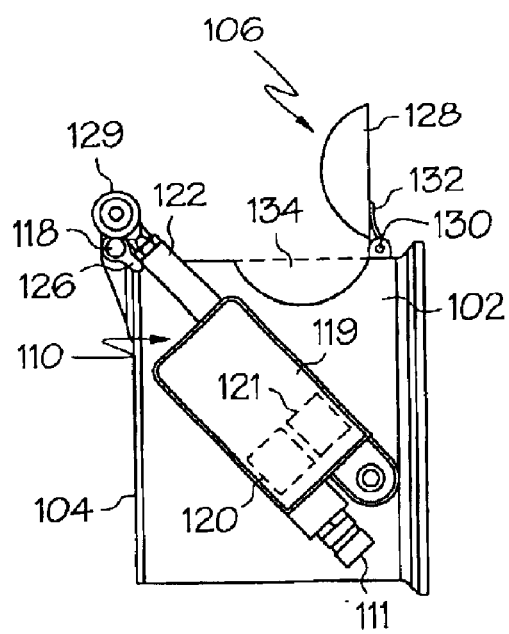
FIGS. 1 and 2 are side and perspective views, respectively, of an aircraft cabin pressure outflow control valve according to an exemplary embodiment of the present invention, with the valve in the fully closed position.
Figure 2:
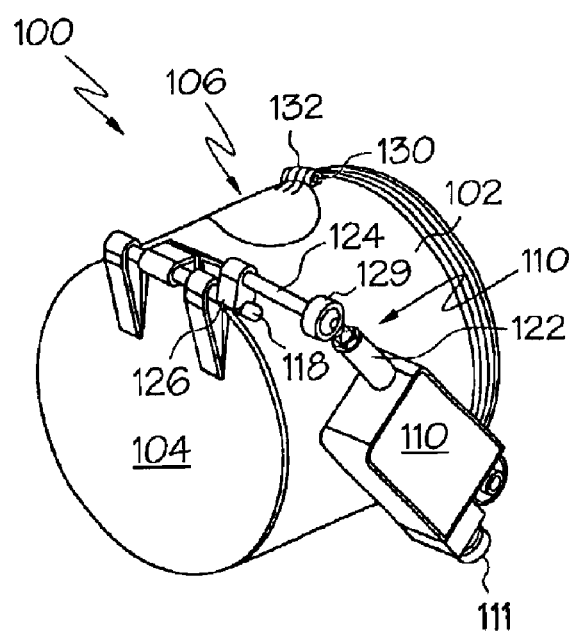

The valve gate 104, which is preferably in the form of a plate or flapper, is rotatable to any one of a plurality of positions between a fully closed position, as shown in FIGS. 1 and 2, and a fully open position, as shown in FIGS. 3 and 4, to thereby control cabin pressure in the aircraft cabin into which it is installed. To provide this rotation, valve gate 104 is rotationally mounted on a shaft 118, which is itself rotationally mounted on the valve body 102 proximate the first flow port 114. The valve gate 104 may be biased toward the fully closed position by aerodynamic pressure, gravity, or by a gravity-assisting biasing element, such as a spring. The actuator assembly 110 engages the valve gate 104 to rotate it to the desired position. Although the valve 100 depicted in FIGS. 1–5 is configured with a single gate 104, it will be appreciated that the valve 100 could also be configured with more than one gate 104, and with varying valve gate shapes.

The actuator assembly 110 is preferably mounted on the valve body 102, though it will be appreciated that it could be disposed remote from the valve body 102, and may be any one of numerous known actuator configurations. In the depicted embodiment, the actuator assembly 110 includes a housing 119, one or more motors 120 (shown in phantom in FIG. 1), an actuator arm 122, an actuator shaft 124, and a valve movement tab 126. The motors 120 may be any one of numerous known motor types including, but not limited to electric, hydraulic, and pneumatic, and may be any one of numerous configurations including, but not limited to, linear and rotary motors. The motors 120 are coupled, preferably via appropriate gearing 121, to one end of the actuator arm 122.

In the depicted embodiment, the actuator arm 122 is one of numerous types of mechanisms such as, a jackscrew or ball screw, for which rotation of one portion of the mechanism causes translation of another portion. The actuator arm 122 includes a rod end member 129, which is coupled to the actuator shaft 124, and which is in turn coupled to the valve movement tab 126. The valve movement tab 126 is coupled to the valve shaft 118 and, as will be described more fully below, engages the valve gate 104 to move it to the desired position. With this configuration, in the unlikely event that one or more of the actuator assembly components fail, air pressure would urge the valve gate 104 toward is fully closed position, providing an inherently fail-safe configuration.

The negative pressure relief valve 106 is mounted on the valve body 102, and includes a relief flapper 128 and a shaft 130. The relief flapper 128 is coupled to the shaft 130, which is rotationally mounted on the valve body 102. The relief flapper 128 is biased to seat against, and seal, a negative pressure relief passage 134 formed through a section of the valve body 102 using, for example, an adjustable spring 132. If a negative pressure relief event occurs, which means the pressure within the main flow passage 115 (e.g., outside the aircraft fuselage) exceeds the pressure of the environment outside of the valve body 102 (e.g., within the aircraft cabin) by a predetermined magnitude, the relief flapper 128 will be pushed open against the force of the spring 132 to reduce the differential pressure. Once this differential pressure is reduced to a predetermined magnitude (e.g., the negative pressure relief event has subsided), the spring 132 biases the relief flapper 128 shut. Although the negative pressure relief valve 106 is described and depicted as having a single relief flapper 128 and single shaft 130, it will be appreciated that it could be implemented with two or more relief flappers 128 and two or more shafts 130. It will additionally be appreciated that the valve 100 could include more than one negative pressure relief valve 106.

Figure 6:
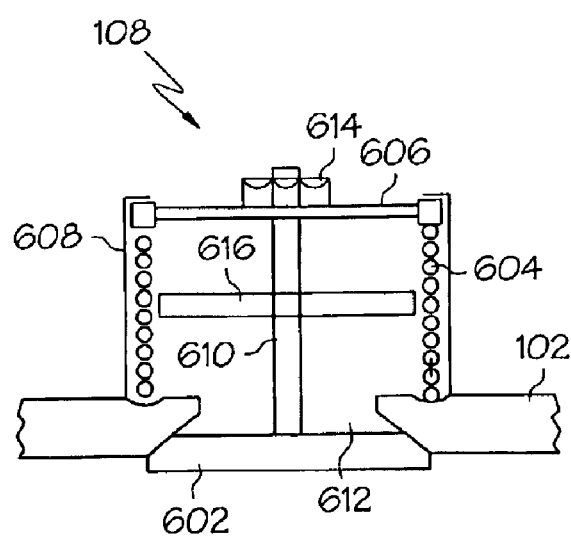
FIG. 6 is a cross section view of an exemplary positive pressure relief valve that may be included in the valve shown in FIGS. 1–4.

The positive pressure relief valve 108, an exemplary embodiment of which is shown in FIG. 6, is also mounted on the valve body 102. The positive pressure relief valve 108 includes a valve gate 602, a spring 604, and an adjustment plate 606, all mounted within a housing 608. The valve gate 602 is coupled to the adjustment plate 606 via a connection rod 610. The spring 604 biases the valve gate 602, outwardly away from the valve body 102. As a result, the valve gate 602 is biased to seat against, and seals, a positive pressure relief opening 612 formed through a section of the valve body 102. If a positive pressure relief event occurs, which means the pressure of the environment outside of the valve body 102 (e.g., in the aircraft cabin) exceeds the pressure within the main flow passage 115 (e.g., outside the aircraft fuselage) by a predetermined magnitude, the pressure causes a load on the valve gate 602 and causes the valve gate 602 to open against the force of the spring 604 to reduce the differential pressure. Once this differential pressure is reduced to a predetermined magnitude (e.g., the positive pressure relief event has subsided), the spring 604 biases the valve gate 602 shut.

In the depicted embodiment, one end of the connection rod 610 extends through the adjustment plate 606. At least a section of the connection rod 610, including the end that extends through the adjustment plate 606, preferably includes threads on its outer surface. An adjustment nut 614 is threaded onto the connection rod 610 and into contact with the adjustment plate 606. The adjustment nut 614 is used to adjust the spring tension, to thereby adjust the differential pressure magnitude at which the positive pressure relief valve 108 opens. The positive pressure relief valve 108 additionally includes a backup plate 616. The backup plate 616 is coupled to the connection rod 610 intermediate the valve gate 602 and the adjustment plate 606. The backup plate 616 will seal the positive pressure relief opening 612 in the unlikely event of a failure of the spring 604 and/or connection rod 610. Although a single positive pressure relief valve 108 is described and depicted, it will be appreciated that the valve 100 could include two or more positive pressure relief valves 108.

The controller circuit 112 is preferably mounted on the valve body 102, and is configured in either a single channel or dual channel (or more) architecture. In either case, each channel includes the instrumentation and control circuitry that is used, among other things, to supply valve position command signals to the valve actuator 110. The valve position command signals include signals used to control air outflow from an aircraft cabin and, as will be described further below, to also provide positive pressure relief. The circuitry may be variously configured but, in a particular preferred embodiment, is configured similar to the circuitry described in commonly assigned, and presently pending, U.S. patent application Ser. No. 10/080,107, entitled "Instrumentation and Control Circuit having Multiple, Dissimilar Sources for Supplying Warnings, Indications, and Controls and an Integrated Cabin Pressure Control System Valve Incorporating the Same," which was filed on Feb. 21, 2002, and the entirety of which is hereby incorporated by reference.

The actuator assembly 110 is adapted to be electrically coupled to, and receive valve position command signals from, the controller circuit 112. Thus, the actuator assembly 110 and controller circuit 112 include electrical plug assemblies 111 and 113, respectively, to provide electrical interconnection. In response to the valve position command signals, the actuator assembly 110 causes the valve gate 104 to rotate to the commanded valve position. For example, if the valve gate 104 is in its fully closed position, as shown in FIGS. 1 and 2, and the controller circuit 112 commands the actuator assembly 110 to position the valve gate to its fully open position, as shown in FIGS. 3 and 4, one or more of the actuator assembly motors 120 will rotate in response to the received command. As the motors 120 rotate, the actuator arm 122 is moved linearly into the actuator assembly housing 119. As the actuator arm 122 moves linearly, it causes the actuator shaft 124 to translate, which in turn causes the valve movement tab 126 to rotate on the valve shaft 118 in the clockwise direction (relative to the views of FIGS. 1–4). As the valve movement tab 126 rotates clockwise, it contacts the valve gate 104 and pushes it to the desired position, which in this instance is the full-open position (FIGS. 3 and 4).

Once the valve is in its full-open position, it will remain there until the controller circuit 112 commands the actuator assembly 110 to move the valve to another position, such as the fully closed position. If the controller circuit 112 does indeed command the actuator assembly 110 to do so, one or more of the actuator assembly motors 120 will rotate in the appropriate direction. This will cause the actuator arm 122 to move linearly out of the actuator assembly housing 119, causing the valve movement tab 126 to rotate counter-clockwise (relative to the views of FIGS. 1–4). As the valve movement tab 126 rotates counter-clockwise, aerodynamic pressure, gravitational force and force from a spring (if provided) urge the valve gate 104 toward the closed position.

The valve 100 implements at least three functions, which include main cabin flow control, redundant positive pressure relief, and redundant negative pressure relief. Main cabin flow control includes controlling airflow into and from the aircraft cabin to substantially maintain aircraft cabin pressure at a safe and comfortable magnitude. This function is implemented by controlling the position of the valve gate 104. In particular, during normal flight conditions, the controller circuit 112 and valve actuator 110 will appropriately position the valve gate 104 to control air outflow from the aircraft cabin based at least in part on aircraft cabin intake airflow, aircraft altitude, and desired aircraft cabin pressure.

The dual positive pressure relief function is implemented using the valve gate 104 and the positive pressure relief valve 108. The valve gate 104 provides the main source of positive pressure relief, and the positive pressure relief valve 108 provides a backup source of positive pressure relief. In particular, if the controller circuit 112, based on various input signals, determines that a positive pressure relief event exists, it supplies appropriate commands to the valve actuator 110, which opens valve gate 104 to reduce the differential pressure. If moving the valve gate 104 does not cause the positive pressure relief event to subside, and/or the differential pressure reaches the setpoint of the positive pressure relief valve 108, the positive pressure relief valve 108 will open to relieve the differential pressure.

Similar to the dual positive pressure relief function, the dual negative pressure relief function is implemented using the valve gate 104 and the negative pressure relief valve 106. As with the positive pressure relief function, the valve gate 104 provides the main source of negative pressure relief, and the negative pressure relief valve 106 provides a backup source of negative pressure relief. In particular, if a negative pressure relief event occurs, the pressure within the main flow passage 115 will urge the valve gate 104 in the open direction against gravitational and/or spring force to reduce the differential pressure. If moving the valve gate 104 does not cause the negative pressure relief event to subside, and/or the differential pressure reaches the setpoint of the negative pressure relief valve 106, the negative pressure relief valve 106 will open (as shown in FIG. 1) to relieve the differential pressure.

The cabin pressure control system valve integrates three major cabin pressure control functions, main cabin flow control, positive pressure relief, and negative pressure relief into a single valve package. This integration of functions simplifies installation, reduces aircraft weight, reduces the number of penetrations through the aircraft fuselage, and reduces the maintenance associated with the cabin pressure control system, all of which can result in significant cost savings.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft cabin pressure control system valve, comprising:
    a valve body adapted to mount proximate an aircraft fuselage, the valve body configured as a flow duct having at least a first flow port, a second flow port, and a main flow passage therebetween;
    an outflow control valve mounted proximate the valve body and moveable between an open position and a closed position to thereby control airflow through the main flow passage;
    a valve actuator mounted on the valve body, the valve actuator adapted to receive valve position command signals and operable, in response thereto, to position the outflow control valve;
    a negative pressure relief valve mounted proximate the valve body and configured to fluidly couple the main flow passage to an environment external to the valve body when fluid pressure in the main flow passage exceeds fluid pressure in the valve body external environment by a first predetermined magnitude; and
    a positive pressure relief valve mounted proximate the valve body and configured to fluidly couple the main flow passage to the valve body external environment when the fluid pressure in the valve body external environment exceeds the fluid pressure in the main flow passage by a second predetermined magnitude.

2. The valve of claim 1, wherein the outflow control valve comprises:
    one or more shafts rotationally mounted on the valve body proximate the first flow port; and
    one or more valve gates each rotationally coupled to one of the shafts.

3. The valve of claim 1, wherein the negative pressure relief valve comprises:
    one or more shafts rotationally mounted on the valve body;
    one or more flappers each coupled to one of the shafts and moveable between an open position, in which the main flow passage is fluidly coupled to the valve body external environment, and a closed position; and
    one or more springs each coupled to at least one of the flappers and configured to bias at least one of the flappers toward the closed position.

4. The valve of claim 3, wherein each spring is adjustable to set the first predetermined magnitude.

5. The valve of claim 1, wherein the positive pressure relief valve comprises:
    a housing;
    a valve gate moveably mounted within the housing and having a portion thereof in fluid communication with the valve body external environment, the valve gate moveable between an open position, in which the main flow passage is fluidly coupled to the valve body external environment, and a closed position; and
    a spring mounted within the housing and configured to bias the valve gate toward the closed position with a spring force, and thereby set the second predetermined magnitude.

6. The valve of claim 5, wherein the positive pressure relief valve further comprises:
    an adjustment plate moveably mounted within the housing;
    a connection rod coupled to the adjustment plate and the valve gate; and
    a backup plate coupled to the connection rod intermediate the adjustment plate and valve gate.

7. The valve of claim 6, wherein the connection rod includes at least a first end that extends through the adjustment plate, and wherein the positive pressure relief valve further comprises:
    threads formed on an outer surface of at least the connection rod first end; and
    an adjustment nut threaded onto the connection rod first end and into contact with the adjustment plate, whereby movement of the adjustment nut on the connection rod adjusts the spring force and thereby adjusts the second predetermined magnitude.

8. The valve of claim 1, wherein the valve actuator comprises:
    a motor adapted to receive the valve position command signals and operable, in response thereto, to rotate in an open direction or a close direction;

an actuator arm coupled to the motor and configured to move translationally in an open direction and a close direction in response to the motor rotation in the open direction and close direction, respectively;

a valve movement tab coupled to the actuator arm and configured to rotate in an open direction and a close direction in response to the actuator arm translation in the open direction and close direction, respectively, wherein the valve movement tab contacts the valve gate to thereby at least move the valve gate from the closed position to an open position.

9. The valve of claim 8, wherein:

the valve movement tab pushes the outflow valve open, against at least gravity, during valve movement tab rotation in the open direction; and at least gravity pushes the outflow valve toward the closed position during valve movement tab rotation in the close direction.

10. The valve of claim 1, further comprising:

a controller circuit mounted on the valve body, the controller circuit adapted to receive one or more aircraft cabin pressure signals and operable, in response thereto, to supply one or more valve actuation signals.

11. An integrated aircraft cabin pressure control system, comprising:

a valve body adapted to mount proximate an aircraft fuselage, the valve body configured as a flow duct having at least a first flow port, a second flow port, and a main flow passage therebetween;

an outflow control valve mounted proximate the valve body and moveable between an open position and a closed position to thereby control airflow through the main flow passage;

a first pressure relief valve mounted proximate the valve body and configured to fluidly couple the main flow passage to an environment external thereof when fluid pressure in the main flow passage exceeds fluid pressure in the external environment by a first predetermined magnitude;

a second pressure relief valve mounted proximate the valve body and configured to fluidly couple the main flow passage to the external environment when the fluid pressure in the external environment exceeds the fluid pressure in the main flow passage by a second predetermined magnitude;

a controller circuit mounted proximate the valve body, the controller circuit adapted to receive one or more aircraft cabin pressure signals and operable, in response thereto, to supply one or more valve actuation signals; and a valve actuator mounted proximate the valve body, the valve actuator coupled to receive the valve actuation signals and operable, in response thereto, to position the outflow control valve.

12. The valve of claim 11, wherein the outflow control valve comprises:

one or more shafts rotationally mounted on the valve body proximate the first flow port; and one or more valve gates each rotationally coupled to one of the shafts.

13. The valve of claim 11, wherein the negative pressure relief valve comprises:

one or more shafts rotationally mounted on the valve body;

one or more flappers each coupled to one of the shafts and moveable between an open position, in which the main flow passage is fluidly coupled to the valve body external environment, and a closed position; and one or more springs each coupled to at least one of the flappers and configured to bias at least one of the flappers toward the closed position.

14. The valve of claim 13, wherein each spring is adjustable to set the first predetermined magnitude.

15. The valve of claim 11, wherein the positive pressure relief valve comprises:

a housing;

a valve gate moveably mounted within the housing and having a portion thereof in fluid communication with the valve body external environment, the valve gate moveable between an open position, in which the main flow passage is fluidly coupled to the valve body external environment, and a closed position; and a spring mounted within the housing and configured to bias the valve gate toward the closed position with a spring force, and thereby set the second predetermined magnitude.

16. The valve of claim 15, wherein the positive pressure relief valve further comprises:

an adjustment plate moveably mounted within the housing;

a connection rod coupled to the adjustment plate and the valve gate; and a backup plate coupled to the connection rod intermediate the adjustment plate and valve gate.

17. The valve of claim 16, wherein the connection rod includes at least a first end that extends through the adjustment plate, and wherein the positive pressure relief valve further comprises:

threads formed on an outer surface of at least the connection rod first end; and an adjustment nut threaded onto the connection rod first end and into contact with the adjustment plate, whereby movement of the adjustment nut on the connection rod adjusts the spring force and thereby adjusts the second predetermined magnitude.

18. The valve of claim 11, wherein the valve actuator comprises:

a motor adapted to receive the valve position command signals and operable, in response thereto, to rotate in an open direction or a close direction;

an actuator arm coupled to the motor and configured to move translationally in an open direction and a close direction in response to the motor rotation in the open direction and close direction, respectively;

a valve movement tab coupled to the actuator arm and configured to rotate in an open direction and a close direction in response to the actuator arm translation in the open direction and close direction, respectively, wherein the valve movement tab contacts the valve gate to thereby at least move the valve gate from the closed position to an open position.

19. The valve of claim 18, wherein:

the valve movement tab pushes the outflow valve open, against at least gravity, during valve movement tab rotation in the open direction; and at least gravity pushes the outflow valve toward the closed position during valve movement tab rotation in the close direction.

* * * * *